(12) United States Patent
Barker

(10) Patent No.: X4372
(45) Date of Patent: Mar. 25, 1826

(54) SLITTING , TIMBER

(76) Inventor: William Barker

William Barker - Letters Patent dated 25th March 1826.

The schedule referred to in these Letters Patent and making part of the same, containing a description in the words of the said William Barker himself of his improvement being a machine for dividing or slitting timber, boards &c.

---

My invention consists in forming a frame box or plane of one, three or more pieces of wood or metal of a size suitable for the work to be performed: what I shall now describe is one for common three quarter stuff —

Take a piece of seasoned wood of about 15 inches long and 3½ inches square: similar to a common plane in shape with a handle on the upper side. Out of the centre of this plane is cut an opening an inch and an half deep and three quarters of an inch wide running through from end to end. Through the sides of this box frame or plane are cut three or more oblong mortices facing each other. These mortices are filled by wedges or [illegible] under which are put knives angling towards the stuff to be cut. The first two knives or cutters do not close on the stuff more than one eighth of an inch, the second about a quarter of an inch or so as to cut the board about half through; and the third knives, blades or cutters join to divide it entirely. These knives are placed about half an inch from the bottom of the plane, the first and third ones within an inch and a half of each end and the second one between both —

Instead of the knives or cutters described rollers made sharp and [illegible] into the sides may be used as circumstances may require. And the depth of strip may be regulated by the opening above the cutters.

If it be necessary several rows of knives, cutters or rollers may be made use of to cut a board in very small strips. Three knives in a row I think best.

When thick stuff is to be slit, it will be necessary to use a crank windlass and strap by horse or manual labour to pull the slitting machine through the stuff.

The operation. The stuff if it be of an ordinary kind
is put on an edge or the tool reversed as may be thought proper
If the stuff be on an edge, the plane is presented to its front end
and a small incision takes place: it is moved on a short distance
and is half cut through; and by the time it goes the length of the
plane it is entirely cut through.

What I claim as my invention ~~and~~
is a frame box or plane with one, two third or more knives
or cutters directly opposite each other, three on each side
to be regulated by wedges or screws for the cutting of timber
boards, or any thing else to which it may be applied

Witnesses
Robert Little
Wm P Elliot.

William Barker.

Received and recorded anew Decr 11.1857

[illegible]
[illegible]

2—328 *a.*

DRAFTSMAN'S DIVISION.

*All communications should be addressed to* "The Commissioner of Patents, Washington, D. C."

*DEPARTMENT OF THE INTERIOR,*

United States Patent Office,

*Washington, D. C.,* ............................, *189*...

*SIR:*

*The printed* copies *of Patent No.* W Barker are *exhausted.* Mar 25 1826

*As soon as printed a copy will be mailed you to complete your order.*

*By direction of the Commissioner:*

*Very respectfully,*

*Chief Clerk.*

8143b6-97-5m